United States Patent
Yamamoto et al.

[11] Patent Number: 6,164,056
[45] Date of Patent: Dec. 26, 2000

[54] COMBINED CYCLE ELECTRIC POWER PLANT

[75] Inventors: Hiroyuki Yamamoto; Jun Yasuraoka, both of Takasago, Japan

[73] Assignee: Mitsubishi Heavy Industries, Ltd., Tokyo, Japan

[21] Appl. No.: 09/381,612

[22] PCT Filed: Jan. 23, 1998

[86] PCT No.: PCT/JP98/00263

§ 371 Date: Sep. 23, 1999

§ 102(e) Date: Sep. 23, 1999

[87] PCT Pub. No.: WO99/37902

PCT Pub. Date: Jul. 29, 1999

[51] Int. Cl.[7] .................................................. F02C 6/18
[52] U.S. Cl. ........................................................ 60/39.182
[58] Field of Search ........................................ 60/39.182

[56] References Cited

U.S. PATENT DOCUMENTS 4,424,668  1/1984  Mukherjee ..................... 60/39.182
5,613,356  3/1997  Frutschi ............................ 60/39.02
5,979,156  11/1999  Uematsu et al. ................ 60/39.141

FOREIGN PATENT DOCUMENTS 8-148035  5/1992  Japan .
5-163960  6/1993  Japan .
6-093879  4/1994  Japan .
9-112215  4/1997  Japan .

Primary Examiner—Timothy S. Thorpe
Assistant Examiner—Ehud Gartenberg
Attorney, Agent, or Firm—Oblon, Spivak, McClelland, Maier & Neustadt, P.C.

[57] ABSTRACT

The present invention provides a combined cycle electric power generating plant that effectively reduces the noise produced by the exhaust of steam in the warm-up process or the like. This plant has a duct which drives the steam used for warming a steam cooling system which cools the high temperature parts which are cooled of the gas turbine at the start of the operation to an exhaust duct of the gas turbine. The steam used for warming a steam cooling system is directed to the exhaust duct of the gas turbine, and the noise which is produced by the exhaust of the steam for warming is silenced by the exhaust duct of the gas turbine.

1 Claim, 1 Drawing Sheet

COMBINED CYCLE ELECTRIC POWER PLANT

FIELD OF THE INVENTION

The present invention relates to a combined cycle electric power generating plant composed of a gas turbine plant and a steam turbine plant.

DESCRIPTION OF THE RELATED ART

A combined cycle electric power generating plant is an electric power generating system which is composed of a gas turbine plant and a steam turbine plant. In this system, the gas turbine plant is operated so as to use a high temperature range of thermal energy and the steam turbine plant is operated to use a low temperature range of the thermal energy, so that the thermal energy is efficiently recycled. Therefore, this electric power generating system has attracted much interest recently.

In this combined cycle electric power generating plant, research and development of the plant are directed to raising the temperature of the high temperature area of the gas turbine, as one point for improving the efficiency.

Meanwhile, a cooling system is necessary for the high temperature area, in consideration of the heat resistance of the turbine structure, and air is conventionally used as a coolant of the cooling system.

However, in case of using air as the coolant, power loss is caused by the compression of the air which is used for cooling by the air-compressor of the system, to achieve the required pressure. Furthermore, the energy level of the gas decreases due to a decrease of the average gas temperature, because the air which is used as the coolant for the parts is mixed with the gas at high temperature in a flow line of the turbine. Therefore, even if a high temperature area is formed using air as the coolant, further improvements in the heat efficiency cannot be expected for the reasons as described above.

To overcome the above problems and to achieve further improvements of the heat efficiency, a cooling system using steam as the coolant instead of air has been proposed.

This type of cooling system is disclosed in Japanese Patent Application, First Publication, No. Hei5-163960, for example. However, this cooling system has many problems which have to be overcome in its details, although it discloses the concept of using steam as the coolant.

For example, purging of the air which remains in the steam cooling system and warming-up of the system after the purge are necessary at the start of the gas turbine, and these processes are performed by the steam which is supplied by the auxiliary steam system in the above disclosed Japanese Patent Application.

The steam supplied by the auxiliary steam system in the above mentioned processes is finally exhausted to the outside of the system. However, there is no consideration of the concrete exhaust method of the steam in the above Japanese Patent Application. Thus, the art of the steam cooling is still at the stage of trial and error, and the conventional art which is based on the purging of the drain in the steam cooling system and the warming-up of the system after the purge at the start of the gas turbine remains incomplete.

Furthermore, in the conventional steam cooling system, the steam supplied by the auxiliary steam system is used for purging of the air which remains in the cooling steam system, and after that, the warm-up is performed, as disclosed above. However, no consideration or countermeasures are proposed for noise which is produced by the exhaust of the steam to the outside of the system during the warm-up process.

Namely, the noise produced by the exhaust of the steam cannot be obviated. However, providing a funnel or a silencer or the like to reduce the noise is not preferable in view of space and cost.

SUMMARY OF THE INVENTION

The present invention was conceived in consideration of the above-described problems, and has as its objective the provision of a method to effectively reduce the noise produced by the exhaust of the steam in the warm-up process or the like.

The present invention was achieved to overcome the above-stated problems. A combined cycle electric power generating plant of the present invention is composed of a gas turbine plant and a steam turbine plant; and the combined cycle electric power generating plant has an exhaust heat recovery boiler for generating steam which drives the steam turbine using the exhaust heat from the gas turbine, and a steam cooling system for cooling the high temperature parts which are cooled of the gas turbine by steam; and excessively heated steam from the steam cooling system is returned to the steam turbine. Furthermore, the combined cycle electric power generating plant has a duct which drives the steam for warming the steam cooling system to an exhaust duct of the gas turbine at the start of the operation. The steam used for warming the steam cooling system is directed to the exhaust duct of the gas turbine, and the noise which is produced by the exhaust of the steam for warming is silenced by the exhaust duct of the gas turbine.

In the present invention, the noise produced in the warm-up process or the like and disregarded in the conventional system, can be easily reduced by using existing equipment, without any additional equipment or costs. Therefore, the stability and a reliance of the plant can be improved.

PREFERRED EMBODIMENTS OF THE INVENTION

Figure 1:
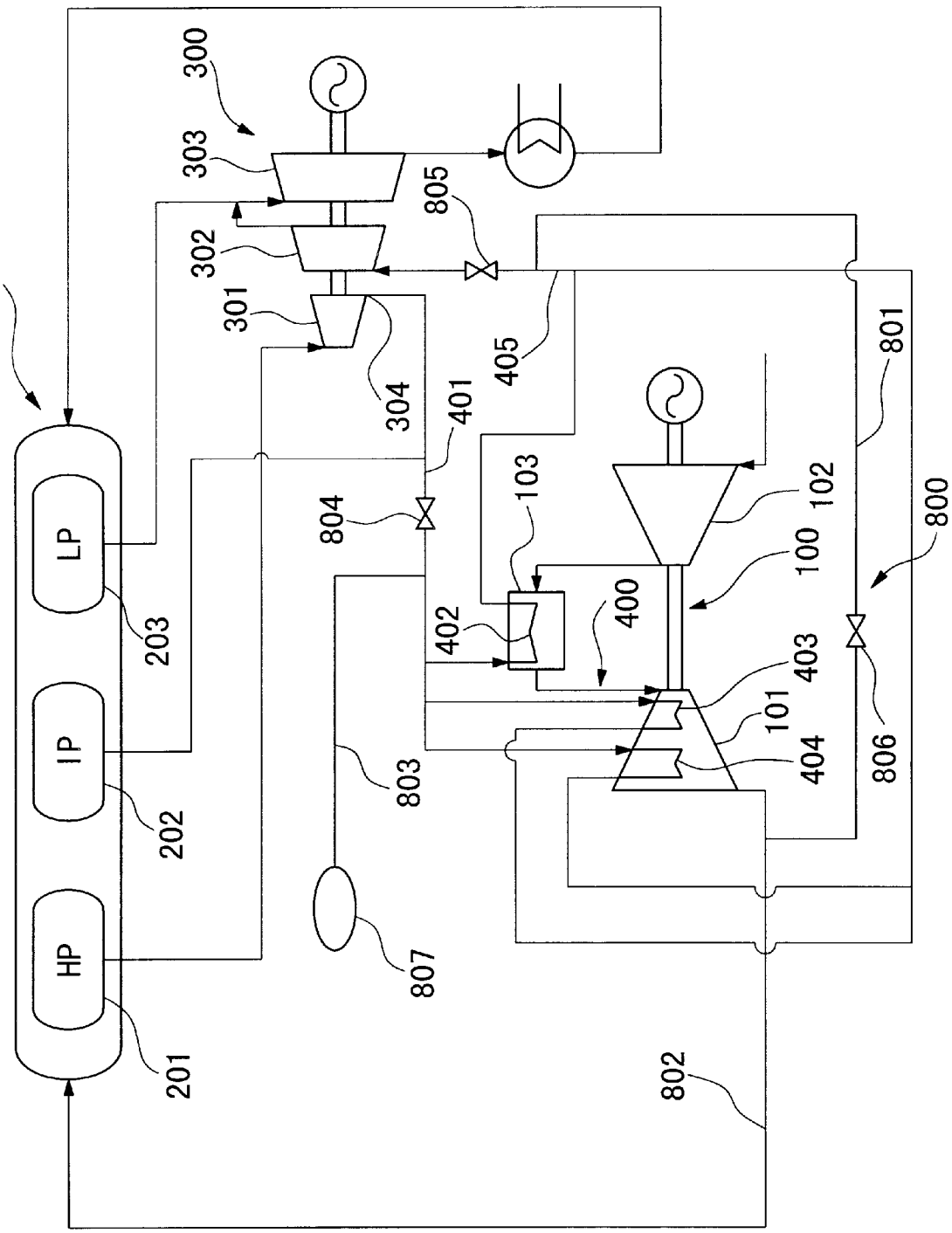
FIG. 1 is an example of a schematic system diagram for a combined cycle plant according to the present invention.

An embodiment of the present invention will be explained with FIG. 1.

Reference Number 100 is a gas turbine plant. This plant is mainly composed of a gas turbine 101, an air compressor 102 which is operated by the gas turbine 101, and a combustion chamber 103 for combusting fuel with compressed air which is formed by the air compressor 102.

Reference Number 200 is an exhaust heat recovery boiler. This boiler uses exhaust gas of the gas turbine 101 as a heat source, and is mainly composed of a high pressure steam generator 201, an intermediate pressure steam generator 202, and a low pressure steam generator 203.

Reference Number 300 is a steam turbine plant. This plant is mainly composed of a high pressure turbine 301 which receives high pressure steam from the exhaust heat recovery boiler 200, an intermediate pressure turbine 302 which receives steam from the aftermentioned recovery line 405 or the like, and a low pressure turbine 303 which receives low pressure steam from the exhaust heat recovery boiler 200.

Reference Number 400 is a steam cooling system. This system is mainly composed of a cooling steam supply line

401 which is connected to the exhaust part 304 of the high pressure turbine 301, a first steam cooling line 402 which branches from the cooling steam supply line 401 and cools the combustion chamber 103, and second and third steam cooling lines 403, 404 which branch from the cooling steam supply line 401, similarly to the first steam cooling line 402, and cooling the high temperature parts which are cooled of the gas turbine 101.

Reference Number 800 is a warming steam exhaust line. This line is composed of a duct 801 which connects a recovery line 405 and a gas turbine exhaust duct 802.

When warming the steam cooling system 400, an auxiliary steam source 807 supplies auxiliary steam for warming to the steam cooling system 400 via duct 803, and the steam used for warming of the cooling system 400 is exhausted from the gas turbine exhaust duct 802 via duct 801.

Generally, the gas turbine exhaust duct 802 is designed to have a high silencing capacity. Therefore, noise which is produced by the steam used for warming and exhausted from the duct 801 is fully silenced by the gas turbine exhaust duct 802.

Furthermore, it is needless to say that the opening and shutting of the regulator valves 804, 805, 806 which are installed in the steam cooling system 401, recovery line 405, and the duct 405 are controlled by the controller (not shown), and the exhaust line 800 is formed by the regulation of these regulator valves 804, 805, 806.

As described above, in the present invention, the noise which is produced by the steam used for warming is effectively silenced by gas turbine exhaust duct 802 which was originally part of the plant. Therefore, the noise can be silenced without additional equipment such as a silencer or an exhaust pipe for the warming steam, or additional costs for the additional equipment.

Note that the present invention is not limited to the embodiments expressed here, but rather, includes variations and modifications thereon, provided these do not depart from the spirit of the invention.

What is claimed:

1. A combined cycle electric power generating plant composed of a gas turbine plant and a steam turbine plant, comprising;

an exhaust heat recovery boiler for generating steam driving said steam turbine using the exhaust heat from said gas turbine, and a steam cooling system for cooling high temperature parts which are cooled of said gas turbine by steam;

wherein excessively heated steam from said steam cooling system is returned to said steam turbine, and a duct leading a steam for warming said steam cooling system to an exhaust duct of said gas turbine at the start of the operation is provided.

* * * * *